United States Patent
Alexander et al.

[11] Patent Number: 5,811,821
[45] Date of Patent: Sep. 22, 1998

[54] SINGLE AXIS VIBRATION REDUCING SYSTEM

[75] Inventors: John D. Alexander, Sunnyvale; Michael D. Kirk, San Jose, both of Calif.

[73] Assignee: Park Scientific Instruments, Sunnyvale, Calif.

[21] Appl. No.: 694,690

[22] Filed: Aug. 9, 1996

[51] Int. Cl.$^6$ .................................................. H01J 37/00
[52] U.S. Cl. ..................... 250/440.11; 248/550; 248/638
[58] Field of Search ............... 250/440.11, 306, 250/310; 248/550, 638; 267/136, 140.5

[56] References Cited

U.S. PATENT DOCUMENTS

| | | | |
|---|---|---|---|
| Re. 33,937 | 5/1992 | Schubert | 267/136 |
| 4,311,053 | 1/1982 | Cucci | 73/704 |
| 4,525,626 | 6/1985 | Kush et al. | 250/227 |
| 4,615,504 | 10/1986 | Sandercock | 248/550 |
| 4,635,892 | 1/1987 | Baker | 248/550 |
| 4,795,123 | 1/1989 | Forward et al. | 248/550 |
| 4,796,873 | 1/1989 | Schubert | 267/136 |
| 4,821,205 | 4/1989 | Schutten et al. | 364/508 |
| 4,892,273 | 1/1990 | Fedor | 244/158 R |
| 5,005,439 | 4/1991 | Jensen et al. | 74/574 |
| 5,156,370 | 10/1992 | Silcox et al. | 248/550 |
| 5,187,519 | 2/1993 | Takabayashi et al. | 355/53 |
| 5,209,326 | 5/1993 | Harper | 188/378 |
| 5,251,863 | 10/1993 | Gossman et al. | 248/550 |
| 5,285,995 | 2/1994 | Gonzalez et al. | 248/550 |
| 5,310,157 | 5/1994 | Platus | 248/619 |
| 5,327,061 | 7/1994 | Gullapalli | 318/649 |
| 5,376,790 | 12/1994 | Linker et al. | 250/306 |
| 5,385,217 | 1/1995 | Watanabe et al. | 188/267 |
| 5,427,347 | 6/1995 | Swanson et al. | 248/550 |
| 5,473,945 | 12/1995 | Grieff et al. | 73/510 |
| 5,478,043 | 12/1995 | Wakui | 248/550 |
| 5,487,533 | 1/1996 | Kurita et al. | 267/140.5 |

FOREIGN PATENT DOCUMENTS

| | | |
|---|---|---|
| 0 628 745 A1 | 12/1994 | European Pat. Off. . |
| 0 676 559 A1 | 10/1995 | European Pat. Off. . |
| 0 748 951 A1 | 12/1996 | European Pat. Off. . |
| 2 271 422 | 4/1994 | United Kingdom . |

*Primary Examiner*—Kiet T. Nguyen
*Attorney, Agent, or Firm*—Wilson Sonsini Goodrich & Rosati

[57] ABSTRACT

A single-axis active vibration reducing system for reducing vibrations in an object in a single axis. The vibration isolation system enables the sensing of motion of the center of mass of an object along a single axis and, with the proper positioning of a single sensor-actuator pair with feedback operation, the dampening of vibrations of the object along that axis. Due to the positioning and alignment of the actuator, the vibration isolation system of the present invention does not introduce appreciable off-axis vibration. The vibration reducing system includes an actuator positioned on the object to impart an actuation force along an actuator axis to reduce vibrations of the object in the vibrational axis without imparting substantial motion to the object other than in the vibrational axis.

22 Claims, 8 Drawing Sheets

SINGLE AXIS VIBRATION REDUCING SYSTEM

BACKGROUND OF THE INVENTION

1. Field of the Invention

This invention relates to a device for reducing vibrations in an object, and, more specifically, reducing vibrations in an object along a single axis.

2. Background of the Invention

A variety of mechanisms have been developed for controlling the generation of vibrations within an object and the transmission of vibrations to the object from a supporting surface, for example a tabletop. These mechanisms may generally be divided into two categories, passive vibration isolation systems and active vibrations systems.

Passive vibration isolation systems are generally materials or devices which by their structure reduce the magnitude of vibrations without actively monitoring the vibrations of the object and producing a controlled action in response in order to counter the vibrations. Passive vibration isolation systems can reduce up to 99% of the vibrational noise within a certain bandwidth, providing noise reduction by a factor of from 20 to 100 or more. However, reducing vibrations by a factor of 100 may not be sufficient to isolate highly sensitive equipment. Passive vibration isolation systems act as low pass filters for vibration. They have a fundamental resonance frequency above which vibrations are substantially reduced. However, vibrational noise from the environment at the fundamental resonance frequency can be transmitted and also amplified. Further, these passive isolation systems offer no isolation below this resonance frequency. Examples of passive vibration isolation systems include dampers, such as rubber pads, and pneumatic isolators ("air-springs").

Active vibration reducing systems, by contrast, include a motion sensor which senses vibrations, an actuator coupled to the object which is capable of applying a correction force to the object to counter the sensed vibrations, and a feedback system which controls the actuator in response to vibrations detected by the motion sensor. The motion sensor typically senses motion relative to an inertial reference frame. Active vibration reducing systems, by acting responsively to sensed vibrations, provide a greater degree of vibration dampening than passive vibration isolation systems in addition to damping vibrations below the resonance of the passive support structure.

A variety of high precision instruments exist in which even small amplitude vibrations can be highly disruptive to the proper operation of the instrument. Such instruments, where precise alignment or close positioning of elements is an important part of the operation, are particularly sensitive to vibrations in a one or more axes of motion. Examples of such instruments include scanning probe microscopes (SPMs) (such as scanning tunneling microscopes, atomic force microscopes, and profilers), scanning election microscopes (SEMs) and transmission electron microscopes (TEMs), and photolithography equipment. For example, an SPM includes a probe that is brought into contact with, or close proximity to, a sample to measure and image materials properties, such as surface topography, to sub-angstrom resolution. One example of an SPM is described in U.S. Pat. No. 5,376,790. Passive vibration isolation systems, such as pneumatic vibration isolation tables, generally do not provide sufficient vibration damping for such instruments in environments where floor born noise is high. Therefore, a need exists for active vibration reducing systems, optionally in combination with passive vibration isolation systems, which can be effectively and/or eliminate used to isolate high precision instruments from vibrations.

There are many systems for which it is desirable to reduce vibration that occurs primarily in a single degree of freedom, for example in a single axis. For example, in an SPM, vibration along the z-axis must be reduced to minimize vibrational influences on tip-to-sample spacing (i.e., the gap between the tip of the probe and the sample). Further, the floor born noise that influences the performance of the SPM primarily affects the SPM in a single axis (namely a vertical motion along the z axis). A single-axis vibration isolation system is therefore needed.

Prior art active vibration reducing systems are not widely used because of their expense and complexity. This is due in part because prior art systems require multiple sensors and actuators to reduce vibrations in an object in a single degree of freedom.

Prior art active vibration reducing systems position the actuators and sensors significantly displaced from the center of mass of the object being isolated. Typically, the actuators are located near, or on, the support structure of a passive isolation system. Such placement of the actuators induces vibrations in the object in directions other than the direction of action of each actuator. For example, if the noise from the floor produces vertical motion of the object and an actuator which is displaced from the object's center of mass is used to reduce the associated vibrations, then the actuator will impart both a translational motion to the object and a rotational motion, due to torque applied by the actuator. The introduction of rotational motion to the object in the process of dampening a translational motion makes it necessary to use multiple actuators and sensors so as to cancel the rotational motion of the object caused by each individual actuator.

In order to counteract vibrations induced by individual actuators and provide effective vibration isolation in a single axis, existing active vibration reducing systems require multiple actuator-sensor pairs positioned at the other supporting points. For example, U.S. Pat. No. 4,615,504 discloses an active vibration isolation table with sensor-actuator pairs positioned at each leg. The complexity of existing active vibration reducing systems is illustrated by the system described in U.S. Pat. No. 4,615,504. According to the '504 Patent, in order to provide vibration isolation for a three dimensional structure such as a tabletop which has six degrees of freedom (three translational and three rotational) at least six antivibration devices are required to compensate for coupling between the axes.

An important consequence of the inability of existing active vibration reducing systems to reduce vibrations along a single degree of freedom, without imparting other undesirable motion, is that considerable care must be taken in the design and tuning of feedback circuitry to compensate for cross-coupling between different degrees of freedom. Without compensation, feedback applied to reduce vibrations in one degree of freedom causes vibrations in one or more of the other degrees of freedom. Complex feedback systems are therefore needed in which establishing and optimizing feedback operation is difficult and must typically be redone for each load configuration. As a result of the need to accurately compensate the feedback circuitry for variations in the sensor and actuator responses, the design and manufacture of active isolation systems is expensive and set-up and installation is time-consuming. The need for multiple actuators and sensors in order to reduce cross-coupling and effectively isolate vibrations in a single degree of freedom further increases the complexity and cost of such systems.

A further difficulty associated with active vibration reducing systems is their inability to detect and compensate for vibrations in an object caused by physical distortions in the object due to flexing of the object. For example, in an SPM, the probe and sample ideally are supported by a rigid structure that does not flex in response to vibrations transmitted from the environment. Such flexing undesirably influences the tip-to-sample spacing and contributes a source of measurement noise.

A need therefore exists for an active vibration reducing system which is able to effectively reduce vibrations in a single axis (a translational degree of freedom) without introducing any substantial vibrations in the other axes (the other two translational degrees of freedom and the three rotational degrees of freedom).

A further need exists for an active vibration reducing system which reduces vibrations in two or more axes orthogonal to each other using two or more independent, uncoupled antivibration devices which each reduce vibrations along a single axis.

A further need exists for an active vibration reducing system which detects and compensates for vibrations in an object caused by physical distortions in the object due to flexing of the object. These and other objectives are provided by the active vibration reducing system of the present invention which is described herein.

SUMMARY OF THE INVENTION

The present invention relates to a single-axis active vibration reducing system for reducing vibrations in an object in a single axis. The object could include, for example, an instrument and a platform for the instrument such as the tabletop of a vibration isolation table. The system includes an actuator coupled to the object and capable of imparting an actuation force to the object along an actuation axis. The vibration isolation system of the present invention enables the sensing of motion of the center of mass of an object along a single axis and, with the proper positioning of a single sensor-actuator pair with feedback operation, the dampening of vibrations of the object along that axis. The system is greatly simplified relative to existing active vibration isolation systems which require multiple actuator-sensor pairs and complex feedback circuitry. Due to the positioning and alignment of the actuator, the vibration isolation system of the present invention does not introduce appreciable off-axis vibration.

In one embodiment, the vibration reducing system includes an actuator positioned on the object to impart an actuation force along an actuator axis to reduce vibrations of the object in the vibrational axis. According to this embodiment, the actuation axis is parallel to the vibrational axis and passes sufficiently adjacent to the center of mass to reduce vibrations in the object in the vibrational axis without imparting substantial motion to the object other than in the vibrational axis. In a variation of this embodiment, the system includes a sensor coupled to the object which detects vibrations in the object along an axis parallel to the vibrational axis and produces a signal corresponding to the vibrations in the object detected, and a feedback mechanism which receives the signal from the sensor and produces a control signal which modulates the actuation force applied by the actuator to the object along the actuation axis. In one variation, the actuator and the sensor are physically separated relative to each other on the object. The system may optionally also include a passive isolation system which supports the object. In one embodiment, the object includes a vibration sensitive instrument such as a scanning probe microscope.

In another embodiment, the vibration reducing system includes a passive vibration reducing system which supports the object at least three supporting points, and an actuator which imparts an actuation force along an actuation axis to reduce vibrations of the object along the vibrational axis. According to this embodiment, the actuator is positioned within a perimeter defined by drawing lines between at least three of the supporting points such that the perimeter surrounds the maximum possible area while surrounding all of the supporting points. According to this embodiment, the actuator is not attached to any of the supporting points used to define the perimeter. In one variation of this embodiment, the perimeter defines a first area and the actuator is positioned within an area being centered about the center of mass and having a size that is 75% of the perimeter. Optionally, the size of the area is 50% of the perimeter and optionally 25% of the perimeter. In a variation of this embodiment, the system also includes a sensor coupled to the object which detects vibrations in the object along an axis parallel to the vibrational axis and produces a signal corresponding to the vibrations in the object detected, and a feedback mechanism which receives the signal from the sensor and produces a control signal which modulates the actuation force applied by the actuator to the object along the actuation axis. In one variation, the actuator and the sensor are physically separated relative to each other on the object. The system may optionally also include a passive isolation system which supports the object. In one embodiment, the object includes a vibration sensitive instrument such as a scanning probe microscope.

A multi-axis vibration reducing system is also provided for reducing vibrations of an object along a first vibrational axis and a second vibrational axis. According to this embodiment, the system includes a first actuator positioned to impart a first actuation force along a first actuation axis to reduce the vibrations of the object along the first vibrational axis, the first actuation axis being approximately parallel to the first center of mass axis, and a second actuator positioned to impart a second actuation force along a second actuation axis to reduce the vibrations of the object along the vibrational axis, the second center of actuation axis being approximately parallel to the second center of mass axis. The multi-axis vibration reducing system optionally also includes a third actuator positioned to impart a third actuation force along a third actuation axis to reduce the vibrations of the object along the third actuation axis, the third actuation being approximately aligned with the third center of mass axis.

The present invention also relates to an active vibration reducing system which provides localized flex suppression to an object, such as an SPM. Within this system, a first sensor is coupled to the object for sensing vibrations in a portion of the object adjacent to the base of the object, an actuator is coupled to the object and capable of imparting an actuation force to the object along an actuation axis and a second sensor is coupled to the object for sensing vibrations in the object adjacent the actuator along an axis parallel to the actuation axis, the actuation axis being parallel to both the first and second sensing axis. The difference between the signals from the first and second sensors is indicative of the object's flex. Ideally the actuation is positioned so as to effectively counter act the flexing, and it may be advantageous to position the actuator near the point of maximum flexing. The sensor is located so as to adequately sense the flexing. For example, this location may be adjacent to the actuator. In the case of an SPM the second sensor is located near the probe. The difference between the signals from the first and second sensors of this system indicates a flex in the structure of the SPM. Which will produce noise in the SPM. The system also includes a feedback mechanism coupled to the first and second sensors. The feedback mechanism uses the difference between the first and second sensors to control the actuation force imparted to the object. The feedback mechanism will output a signal to the actuator that will impart a force on the object that will counteract the flex induced by the noise, thereby leaving the object substantially unflexed. Such a system can reduce the need for further vibration isolation systems.

DETAILED DESCRIPTION

The present invention relates to a single-axis active vibration reducing system which reduces vibrations in an object relative to an inertial reference frame of that object in a single-axis. The active vibration reducing system includes a sensor coupled to the object which detects vibrations in the object relative to an inertial reference frame of the object in a vibrational axis and which produces a signal corresponding to the vibrations detected in the object in the vibrational axis. The active vibration isolation system also includes an actuator coupled to the object which is capable of imparting an actuation force to the object along an actuation axis which is approximately parallel to the vibrational axis. Also included in the system is a feedback mechanism which receives the signal from the sensor corresponding to the vibration of the object in the vibrational axis. In response, the feedback mechanism produces a control signal which modulates the actuation force applied by the actuator to the object along the vibrational axis to reduce vibrations in the object in the vibrational axis.

In one embodiment, the actuation axis passes through the center of mass of the object, or as near as practically possible to the center of mass, so that the actuation force does not induce rotational motion. In a further embodiment, the sensing axis also passes through or near to the center of mass.

Figure 1:
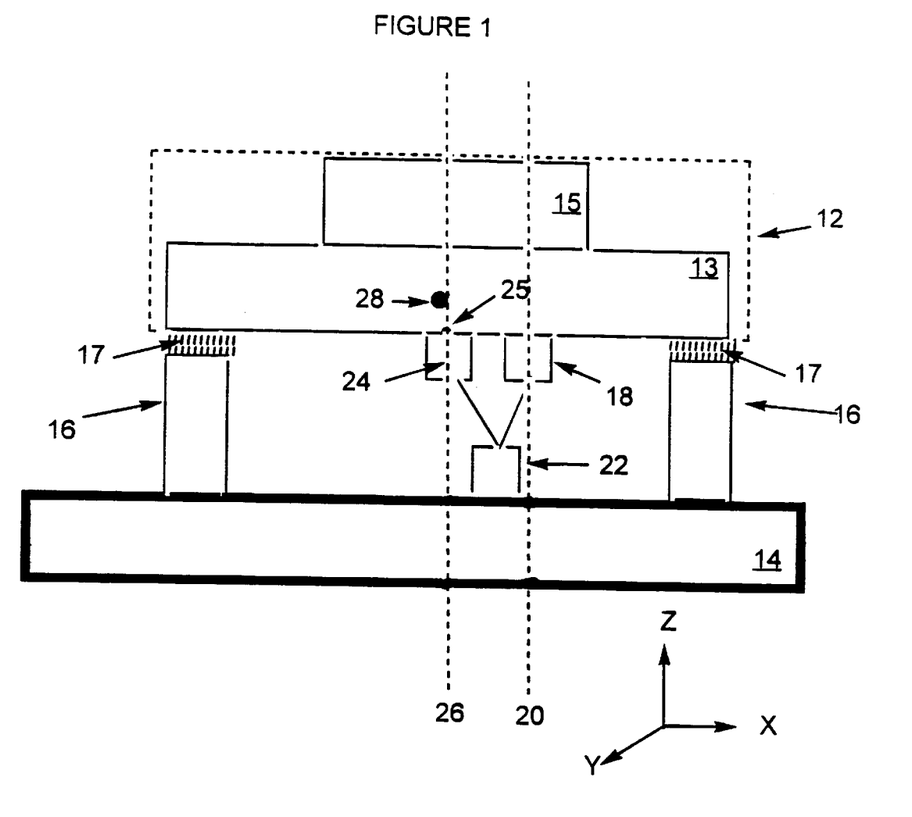
FIG. 1 illustrates an active vibration reducing system according to the present invention.

An embodiment of the active vibration reducing system is illustrated in FIG. 1. Illustrated in FIG. 1 is an object 12 supported upon a floor 14. Floor 14 may be, for example, a rigid structure such as a building floor or a steel tabletop. Object 12 has a center of mass 28. As illustrated in FIG. 1, object 12 may include a table top 13, such as a tabletop of a vibration isolation table, as well as an instrument 15 which is being isolated from vibrations. As illustrated in the figure and discussed herein, the floor 14 may include a support structure such as a passive vibration isolation system 16, incorporating passive vibration isolation devices 17. Passive vibration isolation devices 17 may include, for example, pneumatic isolators, springs, air bladders, elastomers such as Rubberpads, or some other compliant material. The passive vibration isolation system 16 acts as a low pass filter reducing noise with a frequency above its fundamental resonance frequency. It is therefore desirable to use a passive vibration isolation system with a fundamental resonance frequency well below that of the object to be isolated.

Alternatively, the table top 13 and passive vibration isolation devices 17 may be integrated into the instrument 15, such as in an instrument with its own built-in vibration isolation system.

A sensor 18 is coupled to the object 12 in order to detect vibrations of the object 12 relative to an inertial reference frame of the object in a sensing axis 20. The sensor 18 produces a signal corresponding to the detected vibrations of the object 12 in a sensing axis 20 and is coupled to a feedback mechanism 22.

An actuator 24 is coupled to the object 12 such that the actuator 24 is capable of imparting an actuation force on the object, at a point or area of contact 25, along an actuation axis 26 which is approximately parallel to the sensing axis 20. The actuation force produced by the actuator 24 is controlled by the feedback mechanism 22 which modulates the actuation force in response to the vibrations detected in the object 12 in the sensing axis 20.

As illustrated in FIG. 1, the sensor 18 and actuator 24 may be physically displaced relative to each other on the object, for example, the sensing axis 20 and actuation axis 26 are separated from each other. However, the direction of action by the actuator and the direction of sensing of the sensor are preferably the same, for example, the sensing axis 20 and actuation axis 26 are approximately parallel to minimize inducing off axis motion. The amount of allowed off axis motion depends on the attributes of the object to be isolated, for example it depends on the tolerance of object 12 to vibration in other axes. SPM and certain other high precision instruments, off-axis contributions due to misalignment of the actuation axis and sensing axis can be ignored to the extent that vibrational noise does not become appreciable in other axes. For example, in an SPM typical measurement resolution in the Z axis (vertical resolution) is 0.1 Å. In the x and y axes, lateral resolution is 1 Å. As long as vibration produced in the x or y axes due to a non-parallel z actuation axis does not approach 0.1 Å, then that amount of misalignment can be tolerated and is acceptable in this embodiment. As another example, alignment requirements for photolithography equipment are more stringent in the x and y axes than in the z axis.

In one embodiment, the structure supporting object 12, for example a passive vibration isolation system 16, which includes at least three supporting points which defines a perimeter in a plane perpendicular to the actuation axis 26. The perimeter is defined by drawing lines between at least three of the supporting points such that the perimeter surrounds the maximum possible area while surrounding all of the supporting points. For example, if the object is supported at three points, the perimeter defined by the three points is a triangle. If the object is supported at four points where one point is in the middle of a triangle formed by the other three points, the perimeter is still a triangle.

In one embodiment, the actuation axis is positioned within the perimeter and is not attached to any of the supporting points used to define the perimeter. In another embodiment, actuation axis is position within an area centered about the center of mass and having a size that is 75% of the perimeter. In a further embodiment, the actuation axis is within an area that is 50% of the perimeter. In yet a further embodiment, the actuation axis is within an area that is 25% of the perimeter. By positioning the actuation axis 26 within these areas, the rotational force (torque) applied to the object is reduced.

It is desirable to have the sensor 18 positioned close to the center of mass. It is not a requirement that the sensor be within the perimeter defined by the supporting points, but there are advantages to having the sensor so positioned. For example, when the sensor is positioned within the perimeter, the active vibration reducing system is more easily coupled to existing passive systems such as passive vibration isolation tables. Note that this invention allows one to connect the single-axis active vibration reducing system of the present invention quickly and easily to most commercially available passive air-tables employing pneumatic legs or the like.

As noted above, the actuator 24 is placed relative to object 12 such that the direction of action of the actuator is along a line that is near, and preferably passes through, the center of mass of the object being isolated. Since the force provided by the actuator to counteract the vibrations in the sensing axis is applied primarily along that axis, the actuator does not induce appreciable vibrations in other degrees of freedom, such as a rotation about an axis. Additionally, since it is preferred that passive vibration isolators with a fundamental resonance frequency well below that of the object being isolated are used in this invention, The vibrational motion sensed by the sensor is primarily that of a single rigid body translation, as opposed to a combination of translations and/or rotations. Then, by aligning the direction of action of the actuator such that it is parallel to the single rigid body translation and is along a line that is near, and preferably passes through, the center of mass of the object being isolated, the object can be effectively isolated from vibrations in a single axis.

Figure 2:
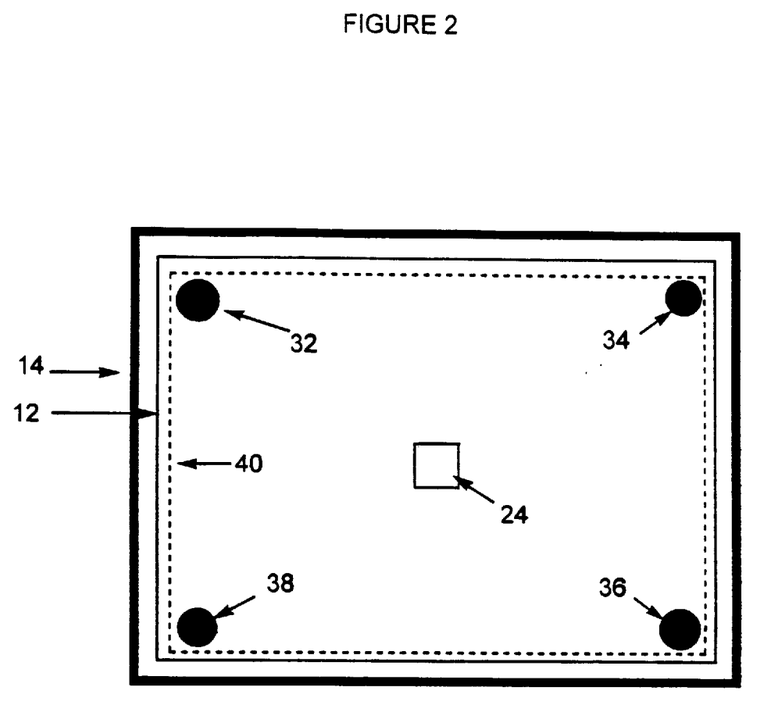
FIG. 2 illustrates an active vibration reducing system which includes a plurality of passive isolators.

When the active vibration reducing system further includes passive vibration isolators, it is preferred that at least three passive vibration isolators be used. Illustrated in FIG. 2 is a system with four passive vibration isolators 32, 34, 36, 38. These passive vibration isolators define a perimeter 40 within which the actuator 24 of the active vibration reducing system is preferably positioned. It should be noted that if an additional passive vibration isolator were positioned adjacent actual 24, as discussed above, the perimeter 40 would not change.

The positioning of the actuator within the perimeter reduces induced motion in the object in degrees of freedom other than in the axis to be isolated. Prior art active vibration isolation systems couple the sensors and actuators to the support structure for the object which were positioned near the perimeter of the object where they would induce motion in the object in other degrees of freedom. The undesired motion grows worse the further the actuator is from the center of mass of the object. One embodiment of our invention has been shown to reduce the passive vibration isolation system resonance response to external noise by at least a factor of 20 as well as to reduce transmission of vibrations through the passive system at both higher and lower frequencies. Further, improvements in an SPMs performance have been shown, with decreases in the noise level of the SPM's vertical measurement by a factor of 2 or better depending on the environmental noise.

The active vibration reducing system of the present invention can also be designed to reduce vibrations along two or more axes by arranging two or more separately operating single-axis active vibration reducing systems, as described above, about the object to be isolated, each of the active vibration reducing systems actuating the object along an axis that is orthogonal to the actuation axes of the other vibration reducing system(s). Because the separate actuators act on the object in orthogonal axes which pass through or near to the center of mass of the object, they do not apply an appreciable torque to the object thereby inducing motions in the other axis. Therefore the feedback mechanism of each active vibration isolation system can be operated independently. The system does not suffer from the cross-coupling affects associated with prior multi-axis active vibration isolation systems in which the actuators are located on the perimeter defined by the supporting points of the object and therefore can apply undesirable torques to the object.

Figure 3:
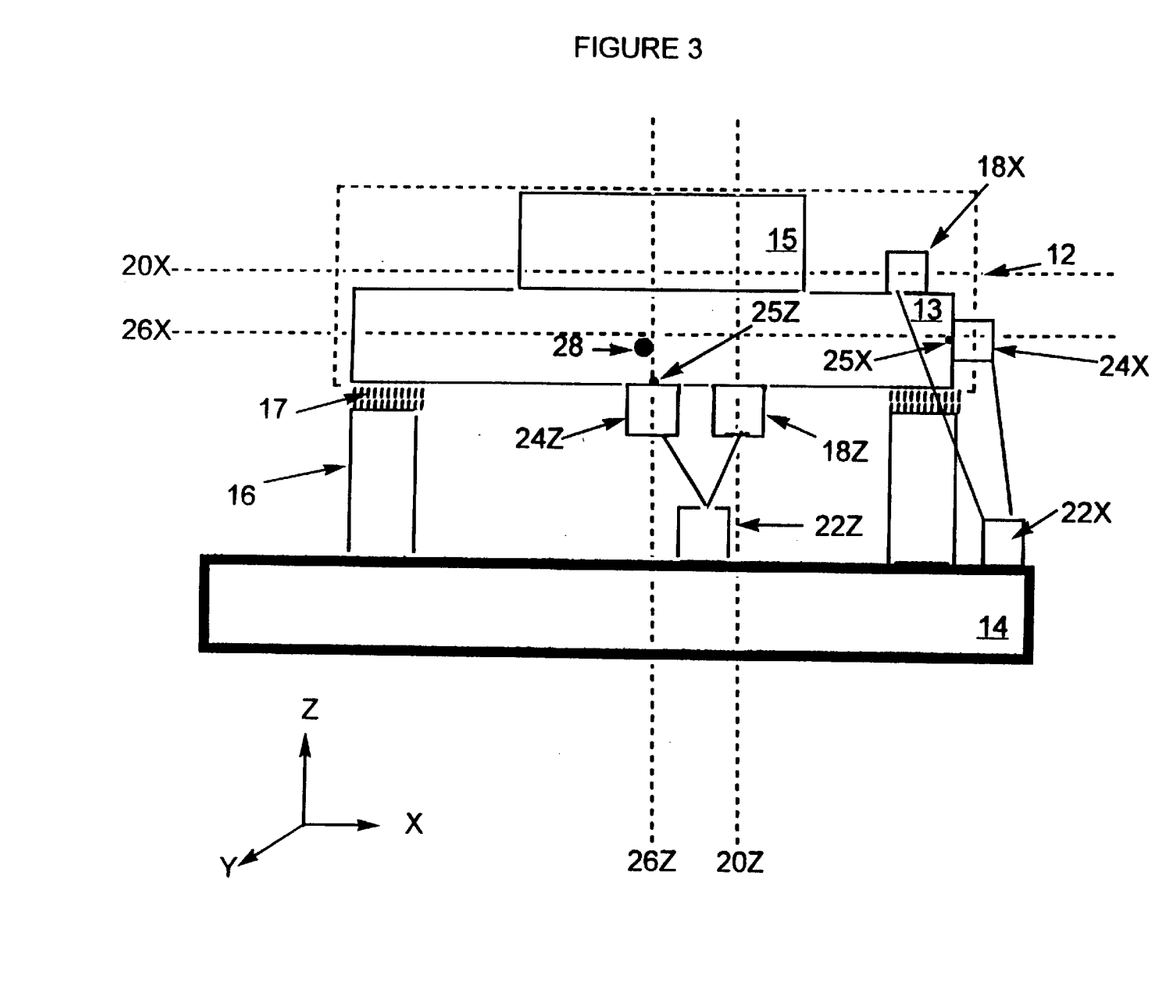
FIG. 3 illustrates an active vibration isolation system according to the present invention which is designed to reduce vibrations in the x and z axes.

FIG. 3 illustrates an active vibration system according to the present invention which is designed to reduce vibrations in the x and z axes. Illustrated in FIG. 3 is an object 12 supported upon a floor 14. Sensors 18X, 18Z for sensing vibrations along the x and z axes are coupled to the object 12 in order to detect vibrations of the object 12 in sensing axes 20X and 20Z, respectively. The sensors 18X and 18Z are coupled to feedback mechanisms 22X, 22Z which produce signals corresponding to the vibrations of the object detected in the x and y sensing axes 20X, 20Z. Feedback mechanisms 22X and 22Z may be independent and uncoupled.

Actuators 24X and 24Z are coupled to the object 12 such that they are capable of imparting actuation forces to the object along actuation axes 26X and 26Z respectively which are respectively parallel to the sensing axes 20X and 20Z. The actuation forces produced by the actuators 24X, 24Z are controlled by the feedback mechanisms 22X, 22Z which modulate the actuation forces in response to the vibrations of the object 12 detected in the sensing axes 20X, 20Z.

In one embodiment, actuation axis 26Z passes near and preferably through the center of mass of object 12. Likewise actuation axis 26X passes near and preferably through the center of mass of object 12 and is orthogonal to actuation axis 26Z. In a further embodiment, actuation axis 26Z passes within the perimeter of the supporting points as discussed above.

This embodiment can be further extended to include a third actuator and sensor to compensate for vibration in a third axis orthogonal to the first two sensor-actuator paks, with the actuation axis of the third actuator likewise passing near and preferably through the center of mass of the object.

Figure 4:
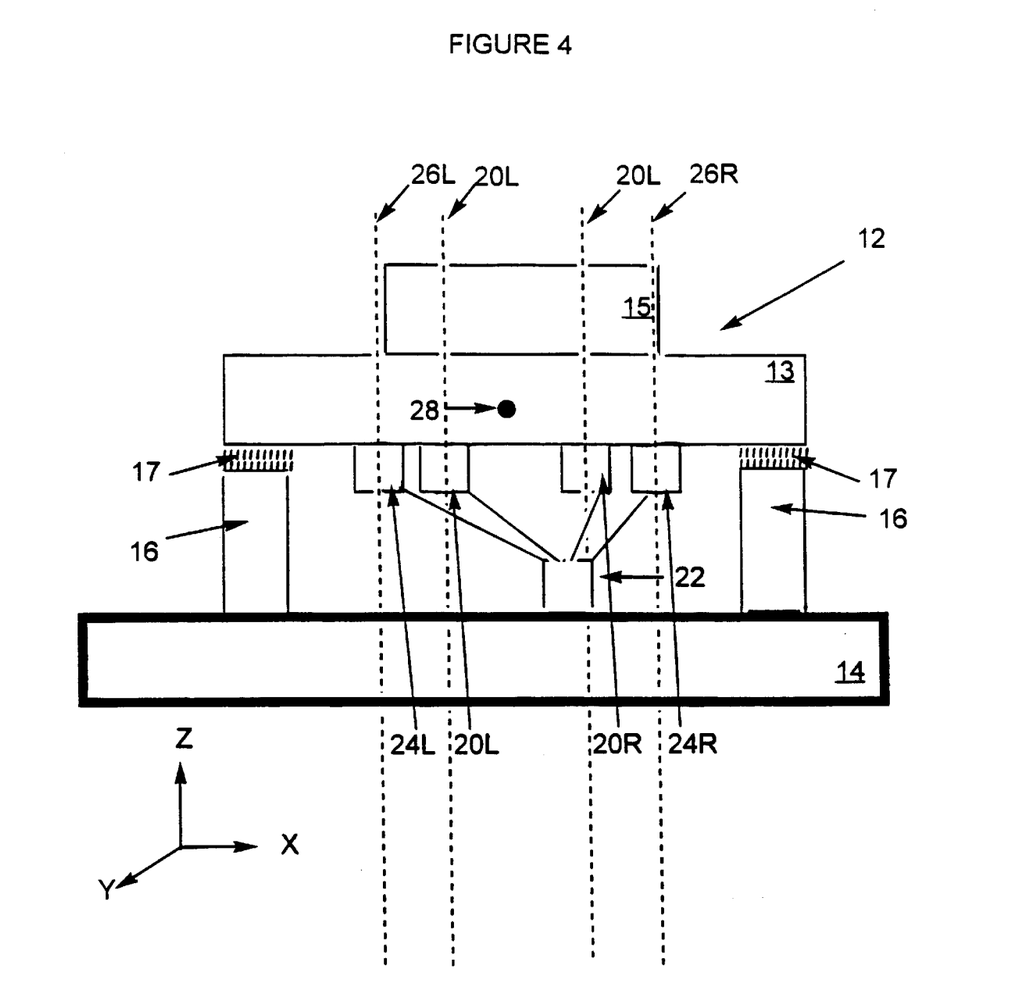
FIG. 4 illustrates an active vibration isolation system in which two or more actuators and sensors are used in combination to reduce vibrations in a single axis.

If the area below the center of mass is not accessible, two or more actuators (displaced equally about the center of mass of the object)and sensors may be used in combination to reduce vibrations in a single axis. One embodiment using multiple actuators and sensors is illustrated in FIG. 4. The system illustrated in FIG. 4 includes left and right actuators 24L, 24R. Both actuators actuate along axes 26L, 26R which are parallel to each other. One advantage of this embodiment is that actuator can function to reduce vibrations in a single axis while having the actuation of the actuators coordinated to also reduce rotation motion in the object which can arise, for instance, due to the actuation of each actuator away from the center of mass.

The system also includes sensors 18L, 18R which are positioned on opposing sides of the center of mass 28. These sensors sense along axes 20L, 20R which are parallel to the actuation axes 26L, 26R According to this embodiment, signals corresponding to the vibrations sensed by the sensors 18L, 18R are sent to common feedback mechanism 22. The feedback mechanism uses these signals to determine translation motion in the object in the sensing axis as well as a rotational motion of the object and controls each actuator in response to reduce both the translational motion as well as a rotational motion of the object. The feedback mechanism does this by sending separate signals to both actuators 24L, 24R in order to reduce vibrations in the object in the sensing axis while compensating for a difference between the amount of vibration in the object at the two sensors.

An example of an algorithm by which differences between the vibrations sensed by the sensors 18L, 18R can be used by the feedback mechanism to control the actuators 24L, 24R is described below. First, the sum of the signals from the two sensors 18L, 18R is taken. Then the differences between the signals from the two sensors 18L, 18R is taken, e.g., (18L—18R) and (18R—18L). The sum of the sensor signals is used to control the total actuation provided by both actuators. Meanwhile, in addition to the sum of the sensor signals, actuation of actuator 24L is also made proportional to differences between the left and right sensors (18R–18L), and actuation of actuator 24R is also made proportional to differences between the right and left sensors (18L–18R). Actuation of the actuator 24L is therefore made proportional to a (18L+18R)+b(18R–18L) while actuation of actuator 24R is made proportional to c(18L+18R)+d(18L–18R) where a, b, c, and d are coefficients which depend on the sensor and actuator and the sensor and actuator positions relative to the center of mass.

Figure 5:
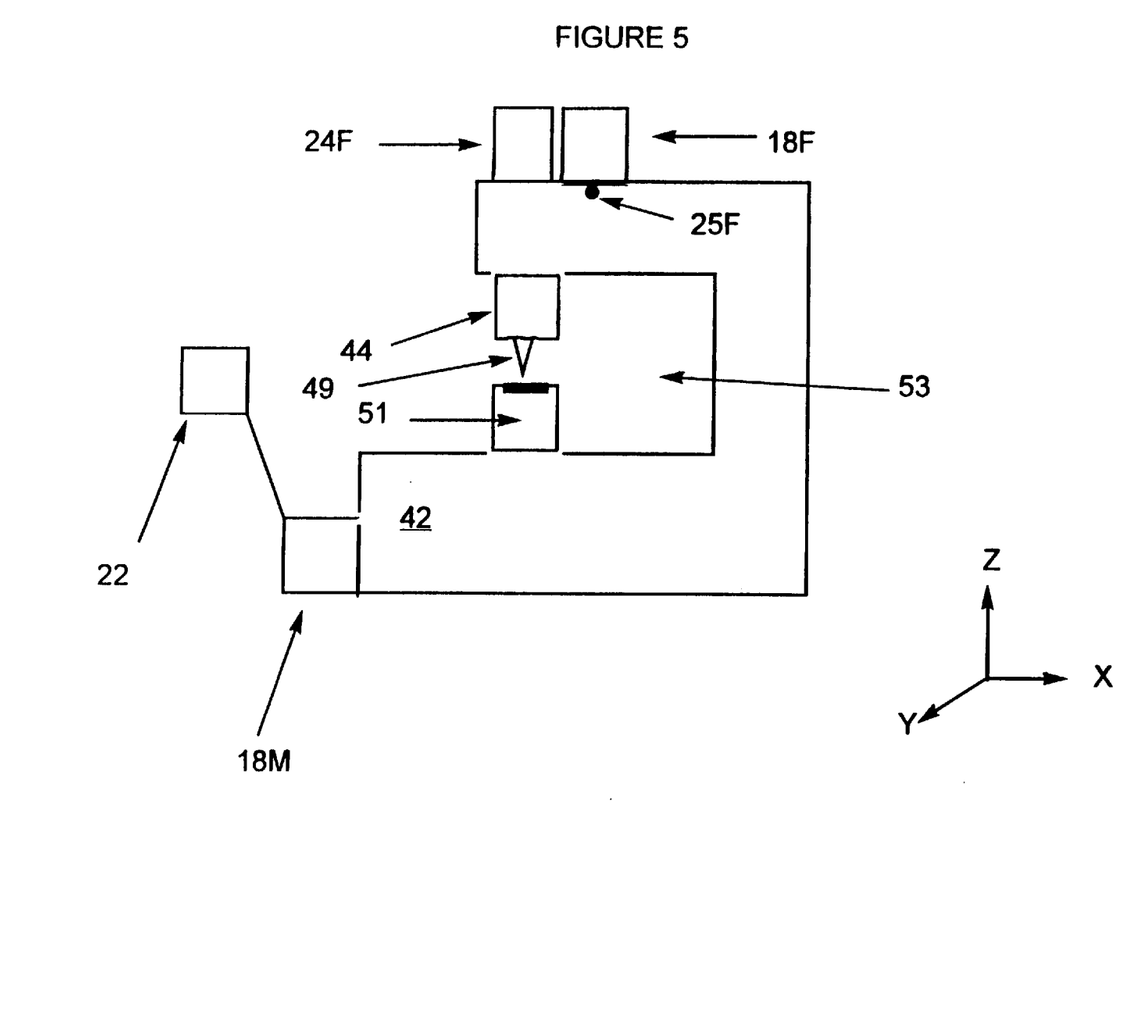
FIG. 5 illustrates an active vibration isolation system in which vibrations in an object due to flexing of the object are reduced.

In a further embodiment of the invention, an active vibration reducing system is provided which includes an actuator-sensor pair which reduces flexing in an object due to external vibrations of that object. As illustrated in FIG. 5, this embodiment reduces the effect of vibrations within the object rather than suppressing the transmission of vibrations to the object. In certain objects, such as high precision instruments, external vibration causes flexing within the object which produces undesirable noise and degrades performance. Suppressing such flexing reduces the effect of vibration on that object. In one embodiment two sensors are positioned such that they will give the largest signal indicating the flex of the object. Sensor 18F is located on the "top" of the object, and preferably that portion of the object which experiences the greatest amount of flex relative to the "bottom" portion and produces a signal which is indicative of both the vibrations of the object and any flexing within the object to a second sensor 18M is located on the bottom portion and produces a signal indicative of the vibrations of the object. The difference between these two sensors' signals is a measure of the flex within the object. This different signal is generated and may be filtered and amplified and is fed to the feedback mechanism 22 whose output modulates the actuation of actuator 24F. Actuator 24F is positioned such that it can oppose the flex of the object with significantly the same amplitude and band width as the flexing produced by the vibrations. The actuator 24F thus applies a force to the object leaving the object substantially unflexed.

FIG. 5 illustrates one embodiment of this invention in which object 12 includes a scanning probe microscope (SPM) 42 with a probe 44. The scanning probe microscope 42 may be supported by a structure which includes a passive vibration isolation system 16 as has been described. The SPM 42 will produce a false signal if probe 44 is moved near the sample 53 while external vibrations are causing flexing in the SPM 42. Therefore, actuator 24 applies an actuation force to suppress the flexing, thereby maintaining the tip sample spacing. This flex suppression is particularly important for high precision instruments such as scanning probe microscopes, lithography equipment, and the like. The sensors must be sensitive enough that their difference signal indicates the flex of the object. The output of each sensor will have a relatively large signal component corresponding to the vibration of the object as a whole and a much smaller signal component corresponding to the flex of the object. The dynamic range of these sensors must enable the measurement of both signal components with a sufficient signal to noise ratio to determine the flex of the object. If the sensor signal has noise, that noise may be transmitted to the actuator 24, and the actuator will increase the flex in the object.

A wide variety of actuators are known in the art and may be used in the active vibration reducing system of the present invention. Types of actuators which may be used include, but are not limited to, piezoelectric, hydraulic, magnetostrictive, inertial masses on an actuator and electrostrictive actuators. The actuators must be capable of delivering enough force to oppose the forces applied to the object by external vibrations. The actuators themselves should not produce actuation due to noise in the actuator. The actuator may also function as part of the support for the object. The actuators should not act to couple vibrations from the environment to the object. For example, a hydraulic piston which touches the floor can transmit high frequency vibrations to the object. The actuators should not produce heat that can distort the object.

According to the present invention, it is preferred that the actuator be coupled to the object such that the actuator does not form a solid path through which vibrations can be propagated between the floor, or environment, and the object. This may be accomplished by using a reaction mass coupled only to the object which is moved in a direction opposite to the direction of the vibration being reduced. An example of a reaction mass actuator is illustrated in U.S. Pat. No. 4,635,892. Alternatively, this may be accomplished using an actuator which includes opposing elements not in solid physical contact which can be modulated to either attract or repel each other, thereby enabling actuating forces to be applied to the object in opposing directions. This type of actuation may be accomplished, for example, using inductive forces, capacitive forces, or the application of positive or negative air or water pressure.

Figure 6:
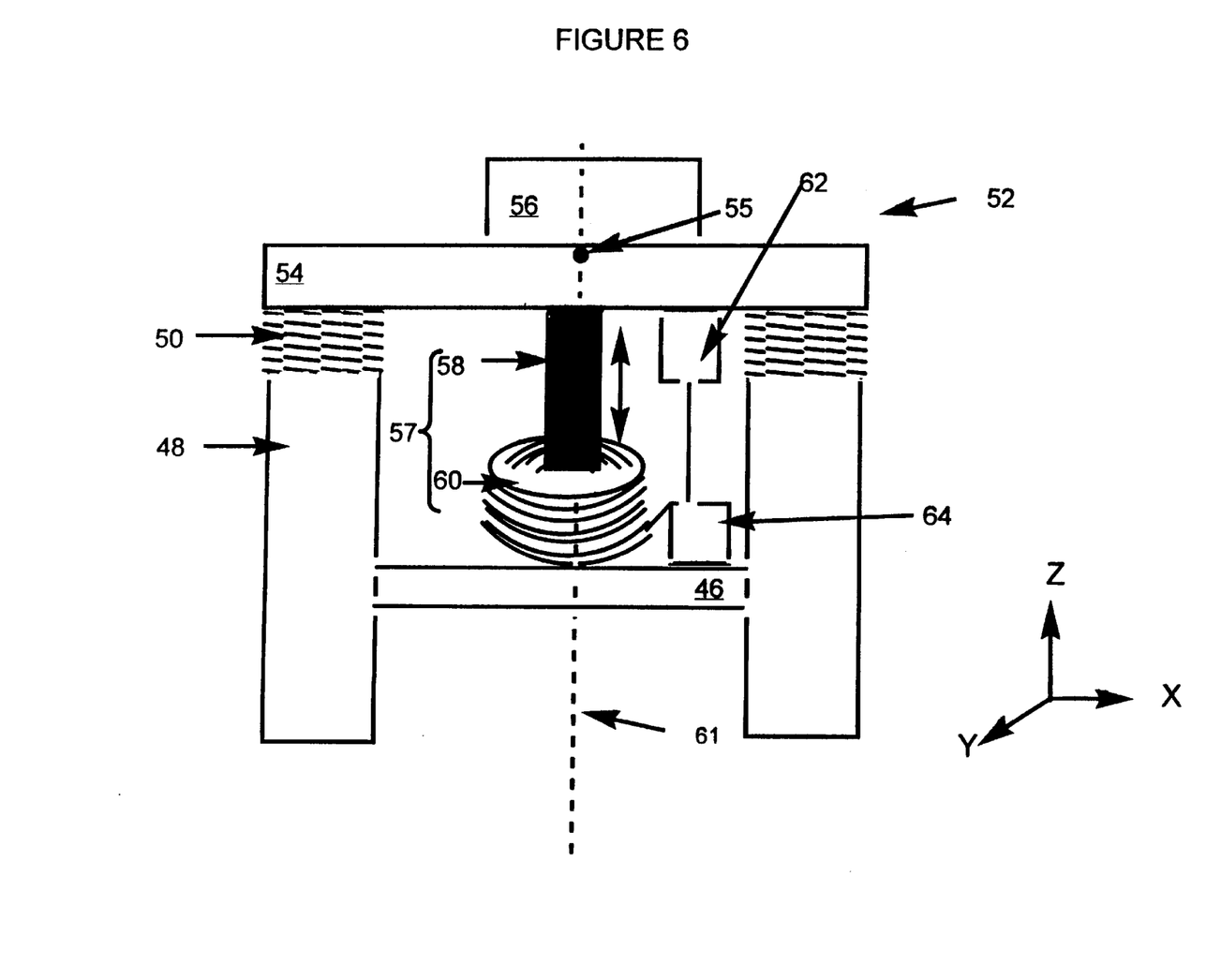
FIG. 6 illustrates a voice coil actuator used in one embodiment of the invention.

FIG. 6 illustrates a voice coil actuator S7 which operates based on inductive forces. As illustrated in FIG. 6, the reference surface 46 is coupled to support structures 48 and a passive vibration isolation system 50. The object 52 includes a tabletop 54 positioned on the passive vibration isolation system 60 and an instrument 56 positioned on the tabletop 54. An actuator 57 and sensor 62 are positioned on the tabletop 54 to detect vibrations of the object. The actuator 57 and sensor 62 are coupled to a feedback mechanism 64 which actuates the actuator 57 in response to signals from the sensor.

As illustrated in FIG. 6, the actuator 57 includes a coil of wire 60 which is rigidly mounted to a support structure, which is illustrated as the legs 48 of a pneumatic isolation table's legs or can be mounted to the floor. The actuator 57 also includes a mass of magnetic material 58 attached to the tabletop 54. The magnet 58 is aligned with the center of the coil and passes within the center bore. An inductive field is created which is aligned with axis 61 when current is passed through the coil of wire 60. Since the actuation force is formed along this axis 61, it is preferred that the axis 61 be near and more preferably pass through the center of mass 55 of the object.

Whether the inductive field attracts or repels the magnetic material 58 attached to the object 12, to exert a force in either direction along the actuation axis, is dependent on the direction of the current passed through the coil of wire 60. The degree to which the magnetic material 58 is attracted or repelled is dependent on the amount of current being controlled by the feedback mechanism 64 in response to signals from the sensor 62. Thus, by controlling the direction and magnitude of the current passing through the wire coil 60, one is able to actuate the object 12 along axis 61 through a path by which the actuator is not necessarily in solid physical contact with the reference surface 46. The ability to actuate an object without the force applied by the actuator traveling through a solid physical path, such as is provided by the voice coil, is advantageous since the actuator does not provide a path through which vibrations can be transmitted to the object.

A wide variety of sensors are known in the art and may be used in the active vibration reducing system of the present invention. Types of sensors which may be used include, but are not limited to, piezoelectric transducers, interferometers, and accelerometers. An accelerometer, for example, senses motion relative to an inertial reference frame by measuring the acceleration, displacement or speed of an inertial mass. In an embodiment, a sensor used is the GS-11D rotating coil geophone produced by GeoSpace Corporation, Houston, Tex.

The feedback electronics used in the active vibration reducing system may be either analog or digital, and may include compensation and/or linearization elements. Combined proportional, integral and derivative feedback systems can be used as well as other well known feedback techniques. Descriptions of some other feedback methods are described in "Digital Control of Dynamic Systems" by Gene F. Franklin and J. David Powell (Addison-Wesley Publishing Company, 1980).

Figure 7:
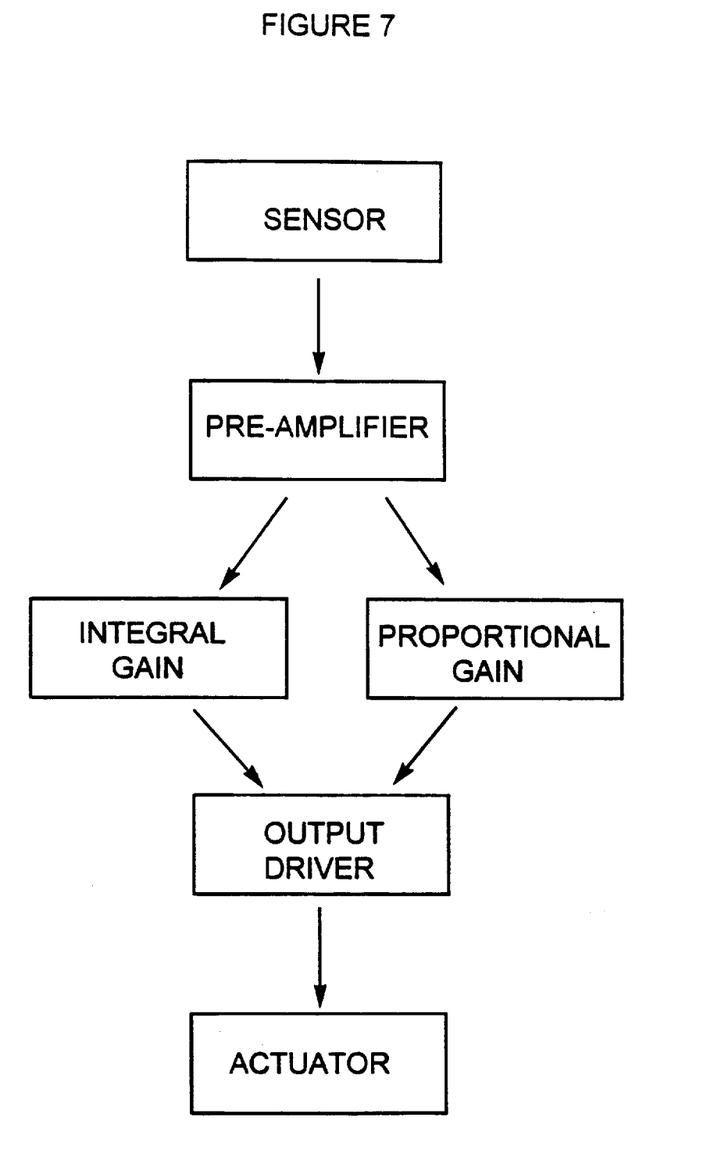
FIG. 7 provides a flow diagram of a feedback circuit which may be used in the active vibration reducing system of the present invention.

FIG. 7 illustrates a flow diagram of a feedback circuit which may be used in the present invention. A sensor generates a signal representing the vibrations of the object to be isolated. This signal can be amplified and filtered by a preamplifier. This preamplifier may also compare this signal against some maximum allowable sensor output. If this signal exceeds this predefined maximum (e.g. a voltage threshold) the feedback circuit can be electrically shutoff until the sensor signal decreases (e.g. the vibrations have fallen below a certain level). This shutoff system can be beneficial so as to not cause the actuator work at its maximum level and therefore produce an undesirable amount of heat. The signal from the preamplifier can then be electrically integrated as well as used to produce a proportional gain signal. These signals can be combined, filtered and amplified to generate an output to control the actuator.

Figure 8:
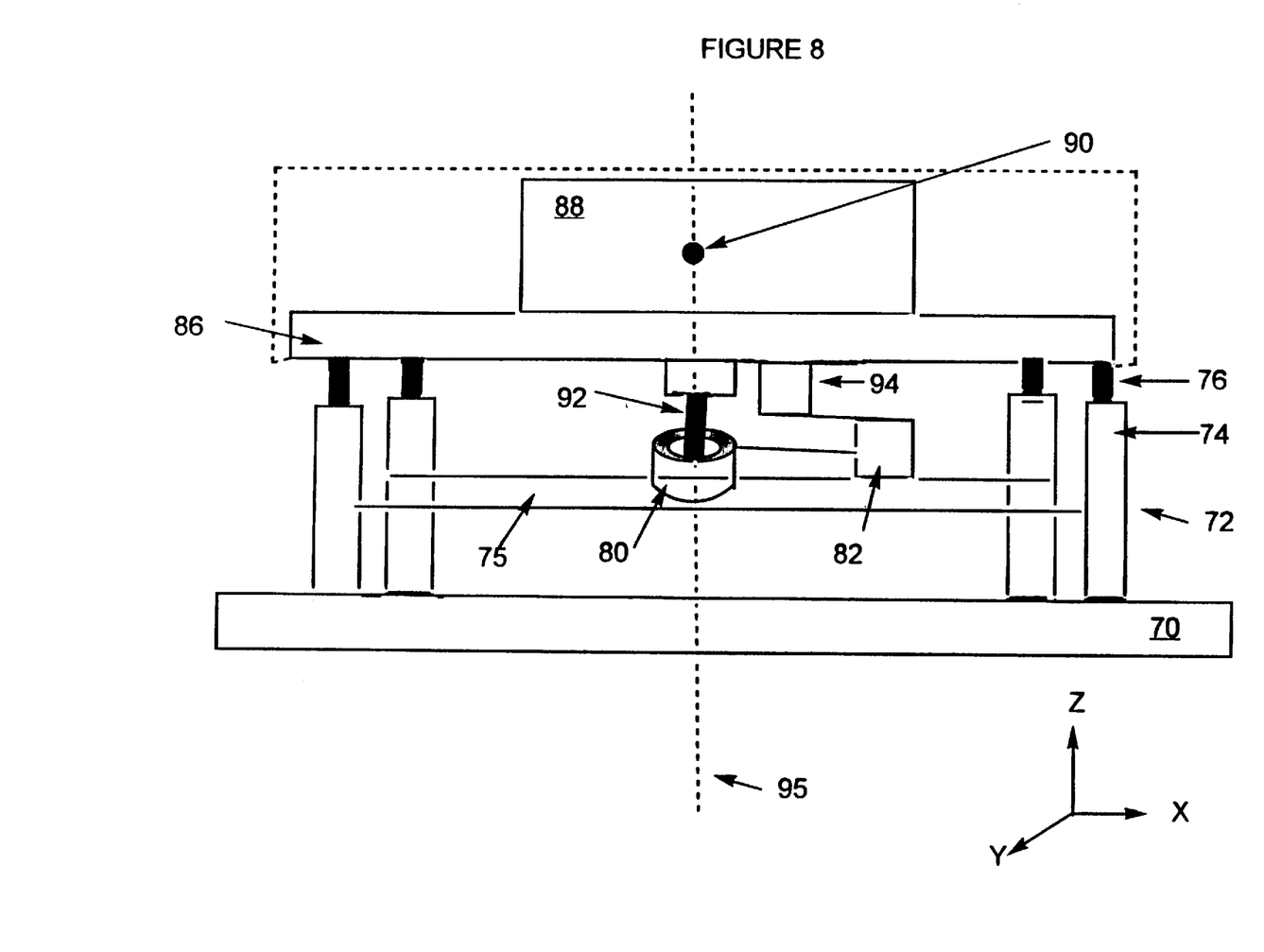
FIG. 8 illustrates another embodiment of the active vibration reducing system of the present invention.

FIG. 8 illustrates a particularly preferred embodiment of the active vibration reducing system of the present invention.

Another embodiment is illustrated in FIG. 8 which shows a support structure 72 is positioned on a floor 70. The support structure 72 can be incorporated in, for example, a vibration isolation table, which includes four support legs 74 and a cross support 75. Support legs 74 and passive vibration isolation devices 76 may form pneumatic isolation legs. A tabletop 86 which forms part of the object 84 is positioned on the passive vibration isolation devices 76 to form an air bed. An instrument 88 is positioned on the tabletop 86. The actuator in this embodiment is a wire coil actuator as described with regard to FIG. 6 and includes a coil of wire 80 attached to the cross support 75 and a mass of magnetic material 92 attached to the tabletop 86. Also positioned on the tabletop is a motion sensor 94, the sensor 94 and wire coil actuator 80 both being attached to a feedback mechanism 82 which is positioned on the cross support 75.

As illustrated in FIG. 8, the coil of wire 80 has an axis 95 about which an inductive field is formed when current is passed through the wire coil 80. It is along this axis that actuation of the object by the actuator is performed. The coil axis 95 is positioned such that it passes through the center of mass 90 of the object 84.

The foregoing description of various embodiments of the invention have been presented for purposes of illustration and description. It is not intended to be exhaustive or to limit the invention to the precise forms disclosed. The scope of the invention is defined by the following claims.

What is claimed is:

1. A vibration reducing system for reducing vibrations of an object in a vibrational axis comprising:
    an object including a scanning probe microscope having a mass, a center of mass; and
    an actuator positioned to impart an actuation force along an actuator axis to reduce vibrations of the object in the vibrational axis, the actuation axis being parallel the vibrational axis and being passing sufficiently adjacent to the center of mass to reduce vibrations in the object in the vibrational axis without imparting substantial motion to the object other than in the vibrational axis.

2. The vibration reducing system of claim 1, the system further including:
    a sensor coupled to the object which detects vibrations in the object along an axis parallel to the vibrational axis and produces a signal corresponding to the vibrations in the object detected, and a feedback mechanism which receives the signal from the sensor and produces a control signal which modulates the actuation force applied by the actuator to the object along the actuation axis.

3. The vibration reducing system of claim 2, wherein the actuator and the sensor are physically separated relative to each other on the object.

4. The vibration reducing system of claim 1 further comprising a passive isolation system supporting the object.

5. The vibration reducing system of claim 1 wherein the actuation force is a force created by the interaction of a magnetic material with an inductive field.

6. The vibration reducing system of claim 5 wherein the actuator includes a wire coil which forms an inductive field and a magnetic material positioned within the wire coil.

7. The vibration reducing system of claim 1, the system further including a passive vibration system separating the object from a reference surface.

8. A vibration reducing system for reducing vibrations of an object along a vibrational axis, the object including a scanning probe microscope having a mass, a center of mass, and a center of mass axis which intersects the center of mass and is parallel to the vibrational axis, the vibration reducing system comprising:
    a passive vibration reducing system supporting the object at least three supporting points; and
    an actuator imparting an actuation force along an actuation axis to reduce vibrations of the object along the vibrational axis, the actuator being positioned within a perimeter defined by drawing lines between at least three of the supporting points such that the perimeter surrounds the maximum possible area while surrounding all of the supporting points, the actuator not being attached to any of the supporting points used to define the perimeter.

9. The vibration reducing system of claim 8 wherein the perimeter defines a first area, the actuator is positioned within an area being centered about the center of mass and having a size that is 75% of the perimeter.

10. The vibration reducing system of claim 9 wherein the size is 50% of the perimeter.

11. The vibration reducing system of claim 9 wherein the size is 25% of the perimeter.

12. The vibration reducing system of claim 8 wherein the passive vibration isolation system includes a passive vibration isolator selected from one of an air-spring, and an elastomer.

13. The vibration reducing system of claim 8, the system further including:
    a sensor coupled to the object which detects vibrations in the object along an axis parallel to the vibrational axis and produces a signal corresponding to the vibrations in the object detected, and
    a feedback mechanism which receives the signal from the sensor and produces a control signal which modulates the actuation force applied by the actuator to the object along the actuation axis.

14. The vibration reducing system of claim 13, wherein the actuator and the sensor are physically separated relative to each other on the object.

15. The vibration reducing system of claim 8 further comprising a passive isolation system supporting the object.

16. The vibration reducing system of claim 8 wherein the actuation force is a force created by the interaction of a magnetic material with an inductive field.

17. The vibration reducing system of claim 16 wherein the actuator includes a wire coil which forms an inductive field and a magnetic material positioned within the wire coil.

18. A multi-axis vibration reducing system for reducing vibrations of an object along a first vibrational axis and a second vibrational axis, the object including a scanning probe microscope having a mass, a center of mass, a first center of mass axis and a second center of mass axis, the first and second center of mass axes intersecting the center of mass and being parallel to the respective first and second vibrational axes, the vibration reducing system comprising:
    first actuator positioned to impart a first actuation force along a first actuation axis to reduce the vibrations of the object along the first vibrational axis, the first actuation axis being approximately parallel to the first center of mass axis; and
    a second actuator positioned to impart a second actuation force along a second actuation axis to reduce the vibrations of the object along the vibrational axis, the second center of actuation axis being approximately parallel to the second center of mass axis.

19. The multi-axis vibration reducing system of claim 18 wherein the first and second actuation axes are orthogonal to each other.

20. The multi-axis vibration reducing system of claim 18 for reducing vibrations of the object along a third vibrational axis, the object further having a third center of mass axis, the third center of mass axis intersecting the center of mass and being parallel to the third vibrational axis, the multi-axis vibration reducing system further including a third actuator positioned to impart a third actuation force along a third actuation axis to reduce the vibrations of the object along the third actuation axis, the third actuation being approximately aligned with the third center of mass axis.

21. The multi-axis vibration reducing system of claim 18 wherein the first, second and third actuation axes are orthogonal to each other.

22. The multi-axis vibration reducing system of claim 18 further including:
    a first sensor coupled to the object which detects vibrations in the object along a first sensing axis parallel to the first actuation axis and produces a signal corresponding to the vibrations in the object detected; and
    a feedback mechanism which receives the signal from the sensor and produces a control signal which modulates the actuation force applied by the first actuator to the object along the first actuation axis.

* * * * *